May 3, 1949.   O. E. ANDRUS   2,469,100
LAMINATED MAGNETIC CORE
Filed Aug. 21, 1947

Orrin E. Andrus
INVENTOR.

BY
ATTORNEY.

Patented May 3, 1949

2,469,100

UNITED STATES PATENT OFFICE 2,469,100

LAMINATED MAGNETIC CORE

Orrin E. Andrus, Altadena, Calif., assignor to A. O. Smith Corporation, Milwaukee, Wis., a corporation of New York Application August 21, 1947, Serial No. 769,855

4 Claims. (Cl. 175—21)

This invention relates to laminated magnetic cores for electric windings and to a method of assembling the laminations thereof to minimize short circuiting due to burrs formed while stamping the laminations.

In fabricating laminations for electric motors and the like, the usual process is to stamp the laminations from generally thin sheet metal. In the stamping operation minute burrs are ordinarily formed on one face of the individual lamina around its periphery.

When the burrs are retained and the laminations assembled together with the burrs on each lamina extending in the same direction as the burrs on adjacent lamina, the burrs cause a considerable amount of eddy currents and short circuiting throughout the stacked core. The efficiency of the motor is thus lowered and additional heat is produced which tends to shorten the life of the windings.

The burrs may be removed by chemical or mechanical operations, but these operations are expensive and add to the cost of the motor.

The present invention proposes to retain the burrs and to overcome the short circuiting effect thereof by positioning each lamina in the stack so that only every other joint between laminations will have burrs, and no short circuiting will occur across the intermediate joints.

One object of the invention is to provide stacked laminations in which short circuiting and the flow of eddy currents is at a minimum.

Another object is to lessen the generation of heat by a novel method of assembling the laminations of a motor.

Another object is to provide electric winding laminations in which a high resistance is obtained in the core.

A further object is to provide a laminated magnetic core in which the cost of removing the burrs is eliminated.

Another object is to provide a method of assembling laminations to prevent piercing of the insulation by the burrs in a substantial number of the laminations.

Other objects and advantages of the invention will appear hereinafter in connection with the following description of the invention illustrated in the accompanying drawing in which.

Figure 1:
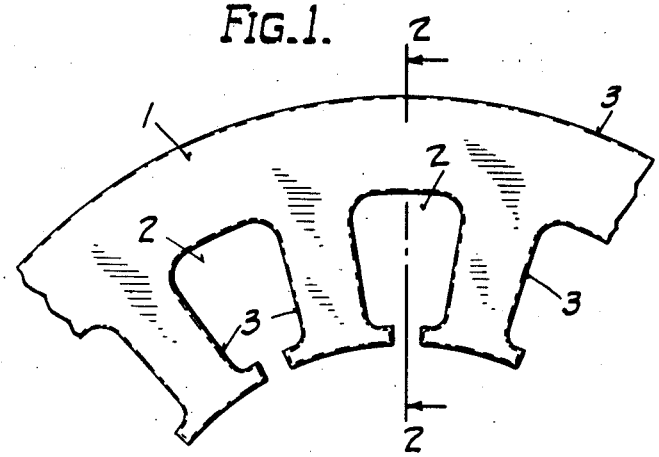
Figure 1 is an enlarged fragmentary face view of a single lamina after the same has been stamped.
Figure 2:
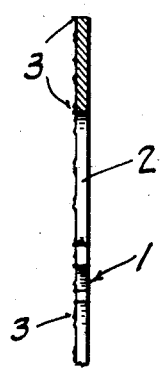
Fig. 2 is a section taken on line 2—2 of Fig. 1.

The drawing illustrates stator laminations 1 having slots 2 stamped in the inner periphery thereof and within which electric windings, not shown, are to be disposed after the laminations are stacked together to provide a motor core.

The laminations 1 are shown as they appear after being stamped or otherwise formed. In the stamped condition the burrs 3 are disposed on one of the faces of each lamina 1 around the periphery of the slots 2 and the inner and outer edges of the lamina. The opposite faces of each lamina 1 are smooth and free from the burrs 3.

The laminations 1 may be stacked in several different ways. For example, they may be assembled in pairs before stacking together into a core, or they may be stacked one at a time. Other ways of assembling the laminations together may be applicable.

Figure 3:
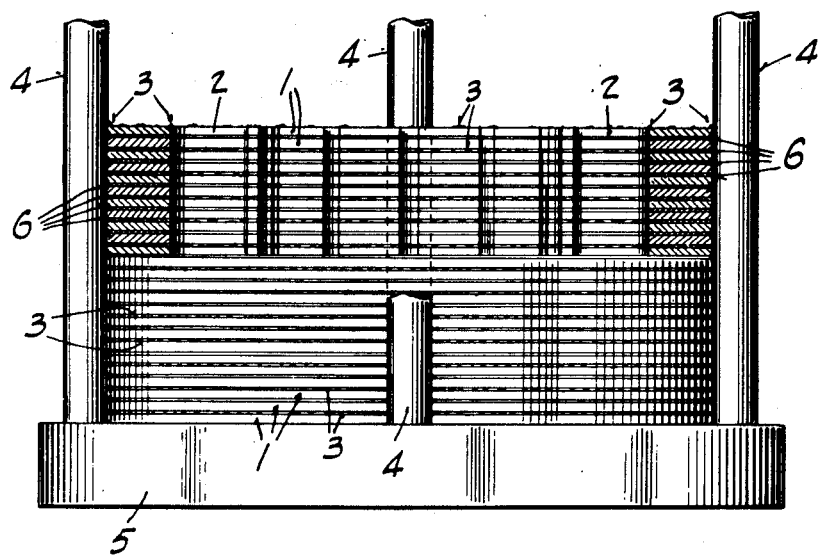
Fig. 3 is a side elevation with parts broken away and sectioned showing the stacking of a plurality of laminations in accordance with the invention.

Fig. 3 illustrates laminations that have been stacked within a fixture comprising a plurality of posts 4 mounted on a base 5. The posts axially align the laminations and are secured by the base 5 which retains the laminations within the fixture.

In stacking the laminations, one on top of the other, within the fixture of Fig. 3, every other lamina is turned over so as to present its burred surface facing the burred surface of an adjacent lamina. This leaves the smooth surface of each lamina facing a smooth surface of an adjacent lamina so that every other separation between laminations in the stack is entirely free from burrs 3.

The laminations are usually separated from one another by a thin film of oxide or other insulating material 6.

After stacking, the laminations are usually pressed tightly together to remove voids which might otherwise result from the presence of burrs 3. The compressed laminations are then usually secured by welding or riveting, not shown. Following this the core is wound with magnet wire after which the assembly may be impregnated and baked with suitable insulation material. The pressing operation does not generally cause contact between the smooth surfaces of adjacent lamina due to the insulation film of oxide or core plate 6.

Although burrs 3 cut through insulation 6, thereby allowing each pair of laminations to come into electrical contact with each other, the damage resulting is far less than that found in a motor core in which the burrs face in the same direction throughout and cause electrical contact between every lamination.

Whether or not insulation 6 is employed between the laminations, short circuiting throughout the stack of laminations is substantially reduced under the present invention compared to a core in which the burrs of the laminations are all turned in one direction.

In addition the invention increases the resistance of laminated cores and eliminates the cost of deburring.

The invention is applicable to any electrical apparatus in which laminations are employed, such as stators, rotors, transformers, magnets and the like.

Various embodiments of the invention may be employed within the scope of the accompanying claims.

I claim:

1. A laminated electromagnetic core composed of stamped metal laminations having burrs along the edges of only one face of each lamina, and in which alternate laminations are reversed to present burred faces adjacent each other and smooth faces adjacent each other throughout the core.

2. In a laminated electromagnetic core composed of stamped metal laminations having burrs along the edges of only one face of each lamina, a pair of laminations assembled with their smooth faces adjacent to present the burrs on their outer faces.

3. A laminated electromagnetic core composed of stamped metal laminations having burrs along the edges of only one face of each lamina resulting from the stamping operation, said laminations being assembled to dispose the burrs of the laminations together at alternate interfaces between the laminations and to dispose the non-burred faces of the laminations together at every other interface between the laminations.

4. A laminated electromagnetic core comprising a plurality of stamped metal laminations having burrs along the edges of only one face of each lamina resulting from the stamping operation, said laminations being assembled to dispose the burrs of the laminations together at alternate interfaces between the laminations and to dispose the non-burred faces of the laminations together at every other interface between the laminations, and insulation disposed between said laminations and free from damage by burrs in the interface between said non-burred faces of the laminations.

ORRIN E. ANDRUS.

REFERENCES CITED

The following references are of record in the file of this patent:

UNITED STATES PATENTS

| Number | Name | Date |
| --- | --- | --- |
| 1,809,197 | Fendrich, Jr. | June 9, 1931 |